3,583,958
PROCESS AND CATALYST FOR MANUFACTURE OF OLEFINIC POLYMERS

Juntaro Sasaki, Iwakuni-shi, Tadao Iwata, Yamaguchi-ken, and Toshio Senoue, Ohtake-shi, Japan, assignors to Mitsui Petrochemical Industries, Ltd., Tokyo, Japan
No Drawing. Filed Apr. 8, 1968, Ser. No. 719,707
Claims priority, application Japan, Apr. 11, 1967, 42/22,609
Int. Cl. C08f *1/56, 3/10*
U.S. Cl. 260—88.2               13 Claims

ABSTRACT OF THE DISCLOSURE

A polymerization catalyst which is particularly useful for the polymerization of alpha olefins or alpha olefins with ethylene which catalyst is characterized by a uniform quality with excellent reproducibility in producing highly crystalline polymers under relatively mild conditions, said catalyst comprising
  (d) a monoether having an alkenyl group in addition to the following three components:
    (a) a halogen compound of titanium in a valency state below its maximum valency state;
    (b) an aluminum compound of the formula $RAlX_2$ and
    (c) a metal complex of the formula $M_2M'F_6$.

---

This application is an improvement of co-pending U.S. application Ser. No. 573,205, filed Aug. 18, 1966, now U.S. Patent 3,496,252.

This invention relates to a process for the manufacture of highly crystalline olefinic polymers at high yields and with good reproducibility to commercial advantage by homopolymerizing an alphaolefin having not less than 3 carbon atoms, or copolymerizing the said alpha-olefin with ethylene, or at least two alpha-olefins having not less than 3 carbon atoms, and to four-component catalysts suitable for the manufacture of the said olefinic polymers. (It is to be understood that the term polymerization used throughout the specification means both homopolymerization and copolymerization.) More particularly, the invention concerns a polymerization catalyst system for polymerizing at least one alpha-olefin having not less than 3 carbon atoms or copolymerizing to alpha-olefins with ethylene, or at least two alpha-olefins containing at least three carbon atoms, comprising, (a) a halogen compound of titanium in a valency state below its maximum valency state,
(b) an aluminum compound of the formula:

wherein X is halogen selected from the group consisting of chlorine, bromine and iodine, and R is a member selected from the group consisting of alkyl and aryl radicals,
(c) a metal complex of the formula:

$$M_2M'F_6$$

wherein M is a metal of group I–A of the periodic table and M′ is an element of group IV of the periodic table, and,
(d) a monoether having an alkenyl group, and a process for the manufacture of olefinic polymers which comprises polymerizing an alpha-olefin containing at least three carbon atoms either alone or in admixture with ethylene or at least two alpha-olefins containing at least three carbon atoms in the presence of at least one four-component catalyst system comprising the above-mentioned components (a), (b), (c) and (d).

We previously discovered that a three-component catalyst comprising a combination of the above-mentioned components (a), (b) and (c) exhibits an excellent polymerizing ability in the polymerization of an alpha-olefin having not less than 3 carbon atoms, for instance, propylene, or the alpha-olefin with ethylene, or at least two of such alpha-olefins.

The present invention relates to an improvement of the previous proposal (copending application No. 573,205, filed Aug. 18, 1966, now Patent No. 3,496,252), and makes it possible to carry out the reaction for the preparation of the catalyst more easily, and to produce catalysts of a uniform quality with better reproducibility. According to the invention, it is also possible to produce highly crystalline polymers under milder conditions and with better reproducibility, and therefore, more improvements have been made in respect of operation and equipment. Generally, in the preparation of an alpha-olefin polymer, particularly polypropylene, there is a tendency that an attempt to increase the yield results in the deterioration of the crystallinity of the resuling polymer, and it has been difficult to provide a catalyst which has a catalyzing ability such as to satisfy both the yield and crystallinity. A more improvement has also been made in this respect by the present invention.

There have hitherto been some proposals as to catalysts for polymerizing olefins comprising a combination of a Ziegler-type catalyst and ethers.

British patent specification No. 933,236 (published Aug. 8, 1963) discloses a three-component catalyst for producing crystalline polyolefines including a catalyst system comprising a halide of titanium, diethyl zinc or an organoaluminum compound such as triisobutyl aluminum and diisobutyl aluminum hydride, and a polyether having at least one acrylic ether group, or an amino ether, and gives a statement with reference to the experimental results that monoamines and monoethers did not increase substantially the percent of crystallinity of the product.

British patent specification No. 963,908 (published on July 15, 1964) which came later proposes a catalyst system consisting essentially of titanium tetrachloride or trichloride, an aluminum alkyl or an aluminum dialkyl monochloride, and a glycol ether, and it is described there that it is possible by virtue of this catalyst to reduce the amount of a lower molecular weight polymer formed in the reaction while simultaneously reducing the formation of a very high-molecular-weight polymer and to give polypropylene having a molecular weight suitable for injection moulding, for instance.

U.S. Pat. 3,156,681 (published on Nov. 10, 1964) provides a catalyst system comprising an anhydrous crystalline titanium composition of aluminum, titanium and chlorine having the unique and characteristic X-ray diffraction pattern in which titanium is essentially trivalent, an aluminum alkyl represented by trimethyl aluminum, a vinyl alkyl ether represented by isobutyl vinyl ether, and an aliphatic ether free of non-benzenoid unsaturation represented by diethyl ether, and it is described there that polymers of $C_1$-$C_{10}$ monoethylenically unsaturated hydrocarbons having a high degree of molecular weight and a reproducibly high degree of crystallinity are obtained at improved yields.

The prior U.S. application (Ser. No. 317,076; U.S. Pat. 3,318,859) published on May 9, 1967 which was after the convention date of the present application discloses a catalyst prepared from violet titanium trichloride, monoalkylaluminum dihalide, and an ether of the formula: $R_1$—O—$R_2$, where $R_1$ represents an alkyl or aralkyl, and $R_2$ is an alkyl, aryl, aralkyl or alkaryl, such as diisopropyl ether and di(n-butyl) ether. In this patent, it is specified that the ether need be used as much as possible in a molar ratio against the monoalkylaluminum dihalide of 0.65:1–2.5:1, preferably 0.95:1–1.5:1.

The catalyst in these proposals are in common in that they are catalyst system comprising an organoaluminum compound, a titanium compound and an ether, and each of them has an essential different combination.

The catalyst system of the invention is distinguished from all of these prior proposals in that it essentially comprises the components (a), (b) and (c) mentioned above. In addition to this common difference, the present invention differs from each of these prior proposals in the following respects.

The present invention is characteristically distinguishable from the proposal of British specification 933,236 in that a monoether as component (d) which is positively denied in the British patent is essentially together with the component (a), (b) and (c).

The further difference between the present invention and British patent specification No. 963,908 is that in this invention, there is used as an aluminum component a monoalkyl or monophenyl aluminum dihalide (as component b) whcih, when combined only with titanium trichloride, does not substantially exhibit an ability of polymerizing alpha-olefins having not less than 3 carbon atoms, and a monoether which is positively denied in British specification No. 933,236 is used as component (d), and that these components (b) and (d) are essential together with components (a) and (c).

The present invention characteristically differs from that disclosed in U.S. Pat. 3,156,681 in that according to the present invention, the component (b) is used and a saturated monoether component such as diethyl ether is not added (positively avoided).

Furthermore, the present invention is characteristically distinguishable from U.S. Pat. 3,318,859 in that a monoether having an alkenyl group is essential together with the components (a), (b) and (c).

The monoethers especially preferable as one component of the four-component catalyst of the present invention are clearly different from the ethers disclosed in the above-mentioned prior patents and prior application. These monoethers are more excellent than other ethers, which constitute one component of the catalyst of the invention, in respect of good properties of the obtained polymer, excellence of the reproducibility, substantial absence of an induction period of polymerization reaction, enhancement of activity in a reaction under the supply of hydrogen, etc.

Reaction is not so vigorous in preparing the catalyst system of the invention as in preparing a known catalyst system containing an ether as one component, and as a pyrophoric aluminum component is not used, easier operation and regulation of preparing a catalyst is attained, thus making is possible to provide a catalyst of more uniform quality with good reproducibility. Hence, it is possible to produce the desired highly crystalline polymers with good reproducibility. There is a general tendency that a catalyst for olefin polymerization of this kind is higher in polymerization activity at higher temperatures, while isotacticity of the polymer formed decreases with the rising of the reaction temperatures. With the catalyst system of the invention, however, as compared with the known catalyst systems, isotacticity tends less to decrease even at high temperatures, which can be substantially ignored. This brings about an advantage that it is not necessary to take the trouble of controlling the reaction temperature to the lowest possible degree.

Furthermore, when the polymerization is carried out in the presence of a catalyst of the invention comprising a monoether contaaining an alkenyl group other than vinyl ethers, an induction period is substantially zero, and operation of the polymerization reaction can be advantageously carried out.

It is usual that the decrease in crystallinity (decrease in isotactic content) is unavoidable when the polymerization is carried out in the copresence of molecular hydrogen to adjust the molecular weight of a resulting polymer. If the catalyst of the invention is used, however, it is possible to have only an effect of controlling the molecular weight exhibited, and to substantially avoid the incident deterioration in crystallinity. The resulting polymer has a large apparent density, and one can obviate such disadvantages inherent to a small apparent density as a large size of the polymerization vessel, small yield of polymer for the amount of the polymerization solvent, and difficulty of stirring a reaction slurry during the polymerization operation.

With the hitherto proposed catalysts containing an ether component, these many improvements could not be achieved simultaneously, and the improvement of some disadvantages inevitably resulted in the sacrifice of other. By using the catalyst system of the present invention these simultaneous improvements have been attained for the first time.

Accordingly, an object of the invention is to provide an improved polymerization catalyst for the preparation of olefinic polymers, and a process for the manufacture of highly crystalline polymers at high yields, with good reproducibility and to commercial advantage, by using the said catalyst.

Many other objects and advantages of the invention will become more apparent from the description which follows.

The catalyst system of the invention is a catalyst essentially comprising the four components (a), (b), (c) and (d).

As component (a), a halogen compound of titanium in a valency state below its maximum valency state, particularly titanium halide is used. The component (a) itself is well known. Examples are lower valency complexes of titanium obtained by reducing titanium tetrahalide with hydrogen or with a metal such as aluminum and silicon, or by reducing titanium tetrahalide with an organometallic compound of a metal of Groups I–III of the periodic table. As the halogen compound, we can mention a chlorine compound, bromine compound and iodine compound, the chlorine compound being preferred.

As component (b), there is used an aluminum compound of the formula: $RAlX_2$ wherein X is halogen selected from the group consisting of chlorine, bromine and iodine, and R is a member selected from the group consisting of alkyl and aryl radicals. Examples of such aluminum compound are ethylaluminum dichloride, ethylaluminum dibromide, isopropylaluminum dichloride, butylaluminum dichloride, butyaluminum dibromide, amylaluminum dichloride, hexylaluminum dichloride, and phenylaluminum dichloride, especially preferable being an alkylaluminum dichloride in which X is chlorine and R is an alkyl group having 1 to 6 carbon atoms.

The compounds expressed by the general formula: $M_2M'F_6$ are, for instance, compounds in which M is an alkali metal such as lithium, sodium and potassium, and M' is a metal of Group IV of the periodic table having an atomic number of 14 to 50 such as silicon, titanium, zirconium and tin. Especially preferable are compounds in which M is a member selected from sodium and potassium, and M' is a member selected from titanium and zirconium. A compound in which M' is silicon comes next.

As the monoether having an alkenyl group, which is an unsaturated monoether, we can mention vinyl lower alkyl ethers, especially vinyl isobutyl ether, and allyl ethers, particularly preferred being an allyl alkyl or allyl phenyl ether of the following formula:

wherein Y is a group selected from the group consisting of a phenyl group and a grouping

wherein $R_1$ and $R_2$ are each selected from the group consisting of a hydrogen atom and alkyl groups which may have a branch. Allyl alkyl ethers in which the sum of the number of carbon atoms of $R_1$ and $R_2$ is 1 to 10, particularly 2 to 8, are especially preferable.

A vinyl alkyl ether tends to come into a resulting polyolefin and denature the properties of the polyolefin, and the degree of the denaturalization varies without reproducibility. On the other hand, the allyl alkyl or allyl phenyl ether of the present invention does not undergo such disadvantages, and this is to reason why the use of the allyl alkyl or allyl phenyl ether is recommended. Some of the other grounds of recommendation are as follows. With the vinyl alkyl ether, there is an appreciable, though short, induction period of polymerization, but with the allyl alkyl or allyl phenyl ether, there is substantially no induction period. Furthermore, in a polymerization in the copresence of hydrogen, there is no substantial effect of enhancement in polymerization activity in the case of the vinyl alkyl ether, but the activity increases with the allyl alkyl or allyl phenyl ether.

Examples of such ethers are allyl ethyl ether, allyl n-propyl ether, allyl iso-propyl ether, allyl n-butyl ether, allyl iso-butyl ether, allyl sec.-butyl ether, allyl n-amyl ether, allyl iso-amyl ether, allyl n-hexyl ether, allyl n-heptyl ether, and allyl n-octyl ether. Other usable allyl ethers are allyl methyl ether and allyl phenyl ether.

The molar ratio of component (b) to component (c) can be within the range of from 10/1 to 1/5, preferably from 7/1 to 1/2. The suitable molar ratio of component (d) to component (b) is from 1/150 to 1/2, preferably from 1/100 to 1/3. Furthermore, the suitable molar of component (b) to component (a) is in the range of from 1/50 to 10, preferably from 1/10 to 10.

In the polymerization of alpha-olefins by using the catalyst system of the invention, no particular restriction is made on the order of addition of the titanium compound, $RAlX_2$, $M_2M'F_6$ and monoether having an alkenyl group. $RAlX_2$, $M_2M'F_6$ and monoether having an alkenyl group may be reacted in a suitable solvent, and the precipitate may be removed by filtration; thereafter, the resulting catalyst solution, on addition of a titanium compound, is offered for polymerization. It is also possible to react $RAlX_2$ and $M_2M'F_6$ in advance, then separate a supernatant liquid by decantation, add a titanium compound and a monoether having an alkenyl group to the resulting solution, and thereafter use it for polymerization.

In mixing the catalyst components of this invention, a suitable diluent, for example, an inert hydrocarbon solvent such as pentane, hexane, heptane, kerosene, cyclohexane, benzene, toluene, xylene can be preferably used. After mixing the four components (a), (b), (c) and the allylether, or the three components (b), (c) and the allylether, the mixture can be aged in an atmosphere of nitrogen at a temperature of 50° to 180° C., with stirring.

The catalyst of the invention is utilized to advantage for the polymerization of alpha-olefinic hydrocarbons, and in general the homopolymerization of alpha-olefins of not less than 3 carbon atoms, or the copolymerization of said alpha-olefins with ethylene, and also for the copolymerization of at least two different alpha-olefins of not less than 3 carbon atoms. It is particularly suitable for obtaining sterospecific homo- and co-polymers from the asymmetric alpha-olefinic hydrocarbons such as propylene, butene and styrene or the branched alpha-olefinic hydrocarbons such as 3-methylbutene-1, 4-methylpentene-1, 3-methylhexene-1 and 5-methylhexane-1.

In copolymerizing alpha-olefins with ethylene or other alpha-olefins, two or more classes of alpha-olefins can be contacted in their mixed state with the catalyst to obtain random copolymers. For instance, mixture of propylene and ethylene in which the mole ratio of them is 95:5 can be contacted with the catalyst of the invention to form a random copolymer. However, to obtain highly crystalline polymers using a mixture of two or more classes of alpha-olefins, such as hereinabove described, it is preferred that the proportion of the two classes alpha-olefins is that wherein one is less than 10 mole percent.

The block copolymerization technique can also be conveniently practised to obtain copolymers of two or more classes of alpha-olefins by using the catalyst system of the invention. In carrying out the block copolymerization, the two or more classes of different alpha-olefins are contacted partially singly or partially in a mixed state, but the sequence of combination can be varied. In order to obtain highly crystalline high polymers containing random copolymerized blocks of two or more alpha-olefins, it is preferred that the composition is such that the resulting polymeric chain is made up predominantly of one of the alpha-olefin monomers, i.e., the second alpha-olefin monomer units occupying less than 15 mol percent.

In practicing the invention any of the various methods of polymerization processes can be chosen. Regardless of whether the batchwise or continuous procedure is chosen in carrying out any of the steps of mixing and ageing the catalyst and polymerizing the alpha-olefins, the operations can be carried out very readily without encountering any difficulties. As mentioned above, an inert hydrocarbon diluent may be used in carrying out the polymerization, or it can also be carried out by suspending the catalyst in the monomers without using any diluent at all.

Examples of such diluents are pentane, hexane, heptane, kerosene, cyclohexane, benzene, toluene and xylene.

The temperature and pressure at the time of the polymerization can be chosen as desired depending upon such factors as the class of monomer to be polymerized, the concentration of the catalyst and the degree of polymerization desired, but usually a temperature ranging from —20° to 100° C. and a pressure ranging from reduced pressure conditions, for example ¾ atmosphere, to a pressure on the order of 50 atmospheres, and preferably from 1 to 20 atmospheres, can be used. Needless to say, a pressure higher than 50 atms. can also be used.

In carrying out the invention a chain-transfer agent such as gaseous hydrogen, alkyl halides and organic compounds having active hydrogen can be introduced into the polymerization system along with the olefin and contacted with the catalyst to suitably adjust the molecular weigh of the resulting polymer. In this case, the introduction of the chain-transfer agent causes no appreciable decline in the crystallinity of the resulting polymer.

The following non-limitative examples will be given for illustrating several modes of practising the invention.

EAMPLE 1

Preparation of catalyst

A 500 ml. reaction vessel was charged with 300 ml. of hexane, and amounts indicated in Table 1 below of ethylaluminum dichloride, potassium titanium fluoride and allyl n-butyl ether. They were reacted for 8.5 hours at 60° C., and cooled to room temperature. Subsequently, the resulting suspension was divided into two parts while stirring sufficiently. One portion was used as one component of the catalyst in the form of the suspension. The other portion was allowed to stand for one day, and the supernatant solution was used as one component of the catalyst.

Polymerization

A 250 ml. glass polymerization vessel was charged with 250 ml. of kerosene and subsequently 30 ml. of either the said suspension or supernatant solution, and 1.54 g. of titanium trichloride (grade AA, produced by Stauffer Chemical Co.). At a temperature of 70° C. propylene was polymerized for 2 hours in the vessel. After the end of the polymerization, the system was cooled to room temperature, and the catalyst was decomposed by addition of methanol. A subsequent filtration and drying of the reaction product mixture gave A (g.), as indicated in Table 1, of a white powdery polymer. In the meantime, the kerosene layer was recovered from the filtrate and concentrated. The amount [B (g.)] of the kerosene-soluble polymer was measured. Further, the white powdery polymer was extracted with boiling heptane, and the amount of the residue was measured. The percentage of the total boiling heptane extraction residue (C) against the total amount of the polymer was calculated in accordance with the following equation.

Boiling heptane extraction residue (percent) against the total amount of the polymer $$= \frac{A(g.) \times C(\text{percent})}{A(g.) + B(g.)}$$

The results are shown in Table 1 below.

TABLE 1

| Catalyst, mmol | | | Polypropylene | | | |
|---|---|---|---|---|---|---|
| | | | Powder | | Kerosene soluble polymer B (g.) | Total boiling heptane extraction residue against polymer (percent) |
| $C_2H_5 \cdot AlCl_2$ | $K_2TF_6$ | Allyl n-butyl ether | Form | Yield A (g.) | Extraction residue C (percent) | | |
| 150 | 25 | 18 | Suspension | 50. | 97.5 | 1.4 | 94.8 |
| 150 | 25 | 18 | Supernatant solution | 52.4 | 97.4 | 1.3 | 95.2 |
| 150 | 25 | 0 | ...do | 40.0 | 95.8 | 1.7 | 92.0 |
| 0 | 25 | 18 | ...do | 0 | | | |
| 150 | 0 | 18 | ...do | 0.4 | | 0.4 | |

EXAMPLE 2

Preparation of catalyst

A 5-liter glass flask was charged with 4.0 liters of kerosene, 2 mols of ethyl aluminum dichloride and 1 mol of potassium titanium fluoride, and they were reacted for 3 hours at 60° C. Subsequently, they were cooled to room temperature, and by addition of 0.15 mol of allyl ethyl ether, a catalyst component solution was prepared.

Polymerization

In the same manner as in Example 1, propylene was polymerized by using 1.54 g. of titanium trichloride (AA) and 38 ml. of the said catalyst component solution. There was obtained 59.2 g. of a white powdery polypropylene. The total boiling heptane extraction residue as against the entire polymer was 95.4%.

EXAMPLE 3

Preparation of catalyst

A 5-liter glass flask was charged with 4.0 liters of kerosene, 2 mols of ethyl aluminum dichloride and 1 mol of potassium titanium fluoride, and they were reacted for 3 hours at 60° C. Subsequently, they were cooled to room temperature, and allowed to stand for one day. Then, the supernatant solution was recovered. The concentration of the organoaluminum compound in this solution was determined by analysis to be 7.8 g./liter based on aluminum. A catalyst component solution was prepared by addition to the solution of 15 mol percent, based on the aluminum, of allyl ethyl ether.

Polymerization

In the same manner as in Example 1, propylene was polymerized by using 1.54 g. of titanium trichloride (AA) and 10 mmol based on aluminum of the said catalyst component solution. There was obtained 58.1 g. of a white powdery polypropylene. The total boiling heptane extraction residue against the entire polymer was 95.8%.

Table 2 shows the results of experiments conducted in accordance with the above procedure but in the absence of allyl ethyl ether or with the addition of other allyl ethers or saturated ethers.

TABLE 2

| Type of ether | Amount of addition (mol percent based on aluminum) | Yield of white powder polymer (g.) | Total boiling heptane extraction residue against the entire polymer (percent) |
|---|---|---|---|
| Allyl iso-propyl ether | 20 | 64.0 | 95.3 |
| Allyl n-butyl ether | 20 | 66.2 | 94.7 |
| Allyl iso-butyl ether | 20 | 65.5 | 95.0 |
| Allyl iso-amyl ether | 20 | 69.4 | 95.3 |
| Allyl n-octyl ether | 20 | 68.1 | 94.1 |
| Allyl phenyl ether | 15 | 51.8 | 94.0 |
| | | 53.3 | 92.4 |
| Di n-butyl ether | 20 | 69.5 | 78.8 |
| Di n-hexyl ether | 20 | 75.4 | 80.3 |

EXAMPLE 4

A 500 ml. glass flask was charged with 250 ml. of kerosene, 0.125 mol of ethyl aluminum dichloride and 0.063 mol of potassium zirconium fluoride, and they were reacted for 1.5 hours at 130° C. Subsequently, they were cooled to room temperature, and allowed to stand for one day. Then, the supernatant solution was recovered. The concentration of the organoaluminum compound in the solution was determined by analysis to be 6.8 g./liter based on aluminum. A catalyst component solution was prepared by addition of allyl ethyl ether of 15 mol percent to this solution, based on aluminum.

In the same manner as in Example 1, propylene was polymerized by using 1.54 g. of titanium trichloride (AA) and 40 ml. of the said catalyst component solution. There was obtained 62.8 g. of polypropylene. The total boiling heptane extraction residue against the entire polymer was 94.9%.

EXAMPLE 5

A 500 ml. glass flask was charged with 250 ml. of kerosene, 0.125 mol of ethyl aluminum dibromide and 0.063 mol of potassium titanium fluoride, and they were reacted for 5 hours at 130° C. Subsequently, they were cooled to room temperature, and a catalyst component solution was prepared by addition of 9.5 mmol of allyl n-butyl ether.

In the same manner as in Example 4, propylene was polymerized. There was obtained 31.4 g. of polypropylene. The total boiling heptane extraction residue against the entire polymer was 95.2%.

EXAMPLE 6

A 500 ml. glass flask was charged with 250 ml. of kerosene, 0.125 mol of n-propyl aluminum dichloride and 0.063 mol of potassium titanium fluoride, and they were reacted for 3 hours at 60° C. Subsequently, they were cooled to room temperature, and a catalyst component solution was prepared by addition of 9.5 mmol of allyl ethyl ether.

In the same manner as in Example 4, propylene was polymerized. There was obtained 49.9 g. of polypropylene. The total boiling heptane extraction residue of the entire polymer was 95.5%.

EXAMPLE 7

The procedure of Example 6 was repeated except that phenyl aluminum dichloride was used instead of n-propyl aluminum dichloride. There was obtained a catalyst component solution.

In the same manner as in Example 4, propylene was polymerized. There was obtained 32.4 g. of polypropylene. The total boiling heptane extraction residue against the entire polymer was 94.1.

EXAMPLE 8

A 500 ml. polymerization vessel was charged with 250 ml. of refined n-heptane and 1.54 g. of titanium trichloride (AA), followed by the addition of 10 mmol, calculated on the basis of aluminum, of the catalyst component solution prepared in Example 3. The system was heated to 40° C. Subsequently, 100 ml. of 4-methylpentene-1 was added dropwise over a period of 20 minutes, and polymerization was performed at this temperature for 3 hours. The catalyst was decomposed by methanol, and the product was repeatedly washed with methanol, and dried. There was obtained 52 g. of poly(4-methylpentene-1). The boiling heptane extraction residue of this polymer was 96.7%.

EXAMPLE 9

In the same manner as in Example 8, 50 ml. of styrene was polymerized for 2 hours at 70° C. There was obtained 16 g. of polystyrene. The boiling methyl ethyl ketone extraction residue of this product was 95.8%.

EXAMPLE 10

Preparation of a hydrocarbon-insoluble catalyst component

A 2-liter glass reaction vessel was charged with one liter of kerosene and 570 mmol of ethylaluminum sesquichloride, and at a temperature below room temperature, 650 mmol of titanium tetrachloride was added dropwise over a period of 30 minutes. Subsequently, the system was heated to 40° C., and the reaction was carried out for 3 hours. The resulting hydrocarbon-insoluble precipitate was separated by decantation, and washed several times with kerosene. The resulting suspension was heated for 2 hours at 140° C., and the concentration of a trivalent titanium was titrimetrically determined to be 0.864 mole/ liter based on titanium.

Polymerization

A 500 ml. polymerization vessel was charged with 250 ml. of kerosene, 10 mmol of the said hydrocarbon-insoluble catalyst component suspension, and 10 mmol, calculated on the basis of aluminum, of the catalyst component solution prepared in Example 3.

The polymerization and after-treatment were effected in the same manner as in Example 1. There was obtained 62.5 g. of a powdery polypropylene. The total boiling heptane extraction residue against the entire polymer was 95.7%.

EXAMPLE 11

4-methylpentene-1 was polymerized under the same conditions as in Example 8 while slowly flowing a nitrogen gas containing 5% by volume of ethylene. There was obtained 22.4 g. of a white powdery polymer. The infrared analysis of this product revealed that it is a copolymer containing 3.2 mol percent of ethylene units.

We claim:
1. A polymerization catalyst system for polymerizing at least one alpha-olefin having not less than 3 carbon atoms or polymerizing the alpha-olefin with ethylene to produce a highly crystalline produce which consists essentially of:

(a) a halide compound of titanium in a valency state below its maximum valency state, (b) an aluminum compound of the formula:

$$RAlX_2$$

wherein X is halogen selected from the group consisting of chlorine, bromine and iodine, and R is a member selected from the group consisting of alkyl and aryl radicals, (c) a metal complex of the formula:

$$M_2M'F_6$$

wherein M is a metal of Group I-A of the periodic table and M' is an element of Group IV of the periodic table, and, (d) an allyl ether having the formula $$CH_2=CH-CH_2-O-CHR_1R_2$$

wherein $R_1$ and $R_2$ are selected from the group consisting of hydrogen atom, normal and branched chain alkyl group or allyl phenyl ether, wherein the molar ratio of (b) to (c) is from 10:1 to 1:5 and (d) to (b) is from 1:150 to 1:2 and the molar ratio of (b) to (a) is from 1:50 to 10:1.

2. The catalyst system according to claim 1 wherein R in the formula $RAlX_2$ is a member selected from the group consisting of an alkyl radical having 1-6 carbon atoms and a phenyl radical.

3. The catalyst system according to claim 1 wherein the formula $M_2M'F_6$, M is a metal selected from the group consisting of lithium, sodium and potassium, and M' is an element selected from the group consisting of elements of Group IV of the periodic table having an atomic number of 14 to 50.

4. The catalyst system according to claim 3 wherein in the formula $M_2M'F_6$, M is a member selected from the group consisting of sodium and potassium, and M' is a member selected from the group consisting of titanium and zirconium.

5. The catalyst according to claim 1 wherein X in the formula $RAlX_2$ is chlorine.

6. The catalyst system according to claim 1 wherein the sum of the carbon atoms of $R_1$ and $R_2$ in the formula is 1–10.

7. The catalyst system according to claim 1 wherein the mole ratio of component (b) to component (c) is from 7/1 to 1/2, and the mole ratio of component (d) to component (b) is from 1/100 to 1/3.

8. The catalyst system according to claim 1 wherein the mole ratio of component (b) to component (a) is from 1/10 to 10.

9. The catalyst system according to claim 1 wherein the said allyl ether is selected from the group consisting of allyl methyl ether and allyl phenyl ether.

10. The catalyst system according to claim 1 wherein the allyl ether is selected from the group consisting of allyl n-propyl ether, allyl iso-propyl ether, allyl n-butyl ether, allyl iso-butyl ether, allyl sec.-butyl ether, allyl n-amyl ether, allyl iso-amyl ether, allyl n-hexyl ether, allyl n-heptyl ether and allyl n-octyl ether.

11. A process for the manufacture of highly crystalline olefinic polymers consisting essentially of polymerizing an alpha-olefin containing at least three carbon atoms either alone or in admixture with ethylene or polymerizing at least two alpha-olefins containing at least three carbon atoms in the presence of a catalyst system consisting essentially of:

(a) a halide compound of titanium in a valency state below its maximum valency state, (b) an aluminum compound of the formula:

$$RAlX_2$$

wherein X is halogen selected from the group consisting of chlorine, bromine and iodine, and R is a member selected from the group consisting of alkyl and aryl radicals, (c) a metal complex of the formula:

$$M_2M'F_6$$

wherein M is a metal of Group I-A of the periodic table and M' is an element of Group IV of the periodic table, and, (d) an allyl ether having the formula $$CH_2=CH-CH_2-O-CHR_1R_2$$

wherein $R_1$ and $R_2$ are selected from the group consisting of a hydrogen atom, normal and branched chain alkyl group or allyl phenyl ether, wherein the molar ratio of (b) to (c) is from 10:1 to 1:5 and (d) to (b) is from 1:150 to 1:2 and the molar ratio of (b) to (a) is from 1:50 to 10:1.

12. The process according to claim 11 wherein the said polymerization is carried out at a temperature in the range of from −20° to 100° C.

13. The process according to claim 11 wherein the said polymerization is carried out at a pressure of ¾ to 50 atmospheres.

References Cited

UNITED STATES PATENTS 3,156,681   11/964   Kanesh et al. _____ 260—93.7

OTHER REFERENCES

Mitsui: Netherlands Application No. 6,612,101, February 1957, pp. 1–14 and 20.

JOSEPH L. SCHOFER, Primary Examiner

E. J. SMITH, Assistant Examiner

U.S. Cl. X.R.

252—429; 260—93.5, 93.7